US012641406B2

(12) United States Patent　　　(10) Patent No.: US 12,641,406 B2
Li　　　　　　　　　　　　　　　　　(45) Date of Patent: May 26, 2026

(54) INFORMATION INDICATION METHOD AND APPARATUS, AND NETWORK DEVICE, USER EQUIPMENT AND STORAGE MEDIUM

(71) Applicant: Beijing Xiaomi Mobile Software Co., Ltd., Beijing (CN)

(72) Inventor: Xiaolong Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 375 days.

(21) Appl. No.: 18/553,037

(22) PCT Filed: Apr. 1, 2021

(86) PCT No.: PCT/CN2021/084923
　　§ 371 (c)(1),
　　(2) Date: Sep. 28, 2023

(87) PCT Pub. No.: WO2022/205303
　　PCT Pub. Date: Oct. 6, 2022

(65) Prior Publication Data
　　US 2024/0171962 A1　　May 23, 2024

(51) Int. Cl.
　　*H04W 76/28*　　(2018.01)
　　*H04W 8/00*　　(2009.01)
　　*H04W 60/04*　　(2009.01)
　　*H04W 68/02*　　(2009.01)

(52) U.S. Cl.
　　CPC .......... *H04W 8/005* (2013.01); *H04W 60/04* (2013.01); *H04W 68/02* (2013.01); *H04W 76/28* (2018.02)

(58) Field of Classification Search
　　CPC ..... H04W 8/005; H04W 76/28; H04W 60/04;　　　　　　　　　　　　　　　　　　　　　H04W 68/02
　　USPC ......................................................... 370/329
　　See application file for complete search history.

(56) References Cited

U.S. PATENT DOCUMENTS

| | | |
|---|---|---|
| 2005/0009547 A1 | 1/2005 | Harris et al. |
| 2008/0057959 A1 | 3/2008 | Ida et al. |
| 2008/0285494 A1* | 11/2008 | Shin .................. H04W 52/0229 |
| | | 370/311 |
| 2013/0244647 A1 | 9/2013 | Makh et al. |
| 2018/0270792 A1* | 9/2018 | Park .................... H04W 68/025 |
| 2021/0314912 A1* | 10/2021 | He ..................... H04W 52/0216 |

FOREIGN PATENT DOCUMENTS

| | | |
|---|---|---|
| CN | 112584471 A | 3/2021 |
| JP | 2014-236342 A | 12/2014 |
| KR | 101862527 B1 | 5/2018 |

OTHER PUBLICATIONS

Extended European Search Report issued in Application No. 21933962.9 dated Apr. 24, 2024, 12 pages.

(Continued)

*Primary Examiner* — Christopher R Crompton
(74) *Attorney, Agent, or Firm* — Finnegan, Henderson, Farabow, Garrett & Dunner, L.L.P.

(57) ABSTRACT

A method for information indication is performed by a network device, and includes: sending an indication to a user equipment (UE), the indication indicating the UE not to perform a cell search under a given time condition.

20 Claims, 7 Drawing Sheets receiving an indication sent by a network device　　301 determining not to perform a cell search under a given time condition　　302

(56)            References Cited

OTHER PUBLICATIONS

3GPP TS 25.304, V15.0.0 (Jun. 2018); 3rd Generation Partnership Project; Technical Specification Group Radio Access Network; User Equipment (UE) procedures in idle mode and procedures for cell reselection in connected mode (Release 15), 58 pages.
Official Action of Substantive Examination for Russian Application No. 2023126451/07, dated Mar. 15, 2024, 16 pages.
International Search Report and Written Opinion of International Application No. PCT/CN2021/084923, dated Jan. 6, 2022, 14 pages.
Notice of Reasons for Refusal issued by the Japanese Patent Office on Sep. 3, 2024, in corresponding Application No. JP 2023-560745, 5 pages.
Office Action issued by the Intellectual Property India on Feb. 27, 2025, in corresponding Application No. IN 202347071441, 6 pages.
Notice of the first review opinion issued by the State Intellectual Property Rights Bureau on Jan. 16, 2025, in corresponding Application No. CN 202180001082.X, 12 pages.
"Discussion on the service link discontinuity and affected procedues for Nb-Iot NTN", Gatehouse, Sateliot, Thales, 3GPP TSG-RAN WG2 #113-e, R2-2101248, e-Meeting, Jan. 25-Feb. 5, 2021, 4 pages.

* cited by examiner

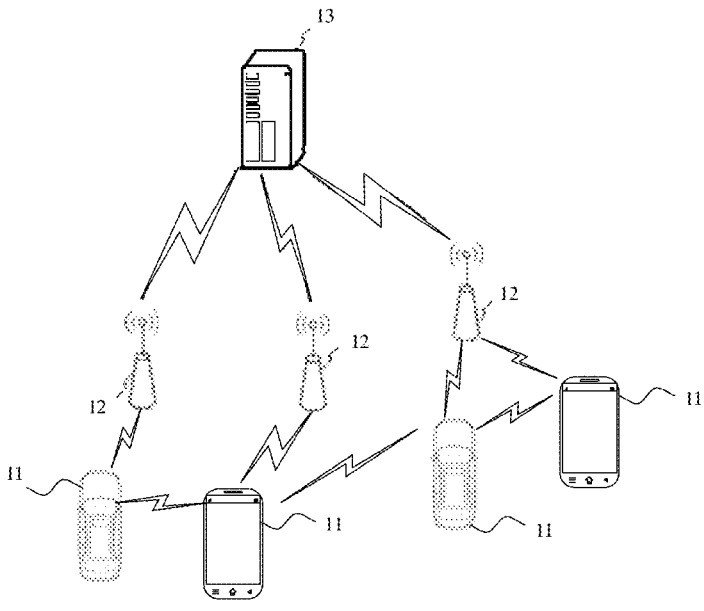
FIG. 1
| 201 |
| --- |
| sending an indication to a UE |
FIG. 2
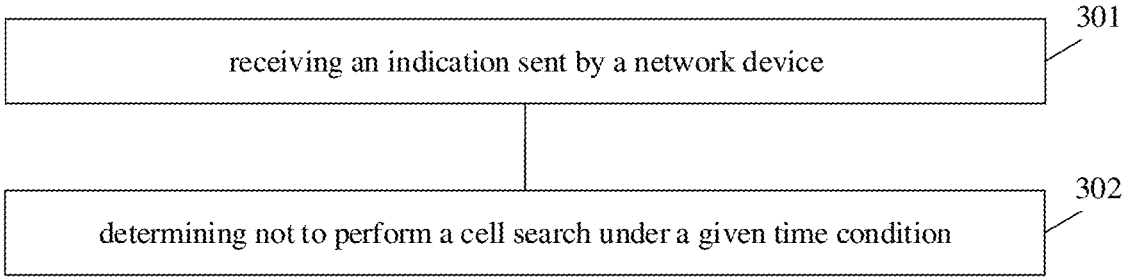
FIG. 3

INFORMATION INDICATION METHOD AND APPARATUS, AND NETWORK DEVICE, USER EQUIPMENT AND STORAGE MEDIUM

CROSS-REFERENCE TO RELATED APPLICATION

This application is a national phase of International Application No. PCT/CN2021/084923, filed on Apr. 1, 2023, the entire content of which is incorporated herein by reference.

TECHNICAL FIELD

The disclosure relates to a method and an apparatus for information indication, a network device, a user equipment (UE), and a storage medium.

BACKGROUND

A network may configure a parameter for a user equipment (UE), such as a discontinuous reception (DRX), an extended discontinuous reception (eDRX), a power saving mode (PSM), to save the power of the UE.

SUMMARY

According to a first aspect of the disclosure, a method for information indication is provided. The method includes:
  sending an indication to a UE: the indication for indicating the UE not to perform a cell search under a given time condition.
According to a second aspect of the disclosure, a method for information indication is provided. The method includes:
  receiving an indication sent by a network device, and determining not to perform a cell search under a given time condition.
According to a third aspect of the disclosure, a network device is provided. The network device includes a processor, a transceiver, and a memory storing an executable program executable by the processor, in which when the processor executes the executable program, the processor performs the method for information indication as described in the first aspect.

BRIEF DESCRIPTION OF THE DRAWINGS

The accompanying drawings, which are incorporated in and constitute a part of this specification, illustrate embodiments consistent with the disclosure and, together with the description, serve to explain the principles of the disclosure.
FIG. 1 is a schematic diagram of a wireless communication system according to some embodiments.
FIG. 2 is a flowchart of a method for information indication according to some embodiments.
FIG. 3 is a flowchart of a method for information indication according to some embodiments.

DETAILED DESCRIPTION

Figure 4:
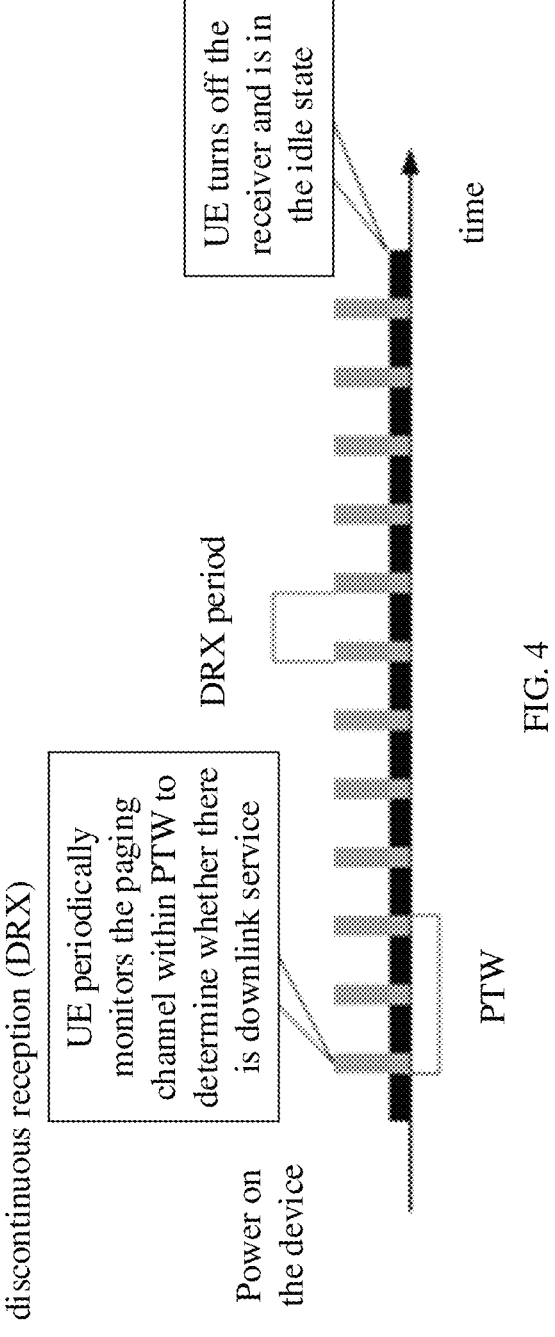
FIG. 4 is a schematic diagram of a DRX according to some embodiments.

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the embodiments of the disclosure. Instead, they are merely examples of apparatuses and methods consistent with aspects related to the disclosure as recited in the appended claims.

The terms used in embodiments of the disclosure are only for the purpose of describing specific embodiments, and are not intended to limit the embodiments of the disclosure. The singular forms of "a", "said" and "the" used in the embodiments of the disclosure and appended claims are also intended to include the plural forms, unless the context clearly indicates other meanings. It should also be understood that the term "and/or" as used herein refers to and includes any or all possible combinations of one or more associated listed items.

It should be understood that although the terms first, second, and third may be used in embodiments of the disclosure to describe various information, the information should not be limited to these terms. These terms are only used to distinguish the same type of information from each other. For example, without departing from the scope of the embodiments of the disclosure, the first information may also be referred to as the second information, and similarly, the second information may also be referred to as the first information. Depending on the context, the word "if" as used herein may be interpreted as "when", "while" or "in response to determining".

With reference to FIG. 1, FIG. 1 is a schematic diagram of a wireless communication system according to some embodiments. As illustrated in FIG. 1, the wireless communication system is a communication system based on cellular mobile communication technologies. The wireless communication system may include terminals 11 and base stations 12.

The terminal 11 may be a device that provides voice and/or data connectivity to a user. The terminal 11 may communicate with one or more core networks via a radio access network (RAN). The terminal 11 may be an Internet-of-Things (IOT) terminal such as a sensor device, a mobile phone (or a cellular phone), and a computer with the IoT terminal such as a fixed, portable, pocket-sized, handheld, built-in computer or vehicle-mounted device, for example, station (STA), subscriber unit, subscriber station, mobile station, mobile, remote station, access point, remote terminal, access terminal, user terminal, user agent, user device, or user equipment (UE). Alternatively, the terminal 11 may also be an unmanned aircraft. Alternatively, the terminal 11 may also be a vehicle-mounted device, for example, a trip computer having a wireless communication function or a wireless communication device connected to the trip computer. Alternatively, the terminal 11 may also be a roadside device, for example, a street lamp, a signal lamp or other roadside device having the wireless communication function.

The base station 12 may be a network side device in the wireless communication system. The wireless communication system may be the 4th generation mobile communication (4G) system, also known as the long term evolution (LTE) system. The wireless communication system may also be the 5th generation mobile communication (5G) system, also known as the new radio (NR) system or 5G NR system. Alternatively, the wireless communication system may also be any generation system. The access network in the 5G system may be called the new generation-radio access network (NG-RAN). The wireless communication system may also be the machine type of communication (MTC) system.

The base station 12 may be an evolved base station (eNB) adopted in the 4G system. Alternatively, the base station 12 may also be a base station (gNB) adopting a centralized and distributed architecture in the 5G system. When the base station 12 adopts the centralized and distributed architecture, it usually includes a central unit (CU) and at least two distributed units (DUs). The CU is provided with a protocol stack having a packet data convergence protocol (PDCP) layer, a radio link control (RLC) layer, and a media access control (MAC) layer. The DU is provided with a protocol stack having a physical (PHY) layer. The embodiments of the disclosure may not limit the specific implementation manner of the base station 12.

A wireless link may be established between the base station 12 and the terminal 11 through a wireless air interface. In different embodiments, the wireless air interface is a wireless air interface based on the 4G standard. Alternatively, the wireless air interface is a wireless air interface based on the 5G standard, for example, the wireless air interface is an NR. The wireless air interface may also be a wireless air interface based on a standard of next generation mobile communication network technology based on the 5G standard.

In some embodiments, an end to end (E2E) link may also be established between the terminals 11, for example, a vehicle to vehicle (V2V) communication, a vehicle to infrastructure (V2I) communication and a vehicle to pedestrian (V2P) communication in a vehicle to everything (V2X) communication.

In some embodiments, the above wireless communication system may also include a network management device 13.

The base stations 12 are coupled to the network management device 13 respectively. The network management device 13 may be a core network device in the wireless communication system. For example, the network management device 13 may be a mobility management entity (MME) of an evolved packet core (EPC). Alternatively, the network management device may also be other core network devices, such as a serving gateway (SGW), a public data network gateway (PGW), a policy and charging rules function (PCRF) unit or a home subscriber server (HSS). The implementation form of the network management device 13 is not limited in the embodiments of the disclosure.

The execution subjects involved in the embodiments of the disclosure may include, but be not limited to, a terminal (UE) in a cellular mobile communication system, a base station of cellular mobile communication, and the like.

In a non-terrestrial network (NTN), when a satellite (such as a non-geostationary satellite) moves, a service duration of the satellite for each UE is limited. When an orbital height of the satellite is 600 kilometer (km), a service duration provided by an NTN cell for UEs is limited due to different cell coverage radiuses and different UE moving speeds. This also means that the UE needs to perform a handover and a cell reselection after a certain duration.

For an NTN-Internet-of-Things (NTN-IoT) network, there is a discontinuous coverage scenario, so that there is no network coverage for UEs in the IoT-NTN sometimes. As the satellite in the NTN moves, even if the UE does not move, the UE also needs to search for a target cell to complete synchronization due to coverage changes of the satellite cell. In order to save the power consumption of the UE, a network device may configure a corresponding power saving mode for the UE. For example, when the UE wakes up from a DRX/eDRX, it needs to monitor a paging message or the UE wake up from a PSM, it needs to perform a tracking area update (TAU). With the rapid movement of the satellite and the discontinuous coverage of the network, the UE needs to search for the network in each frequency band it supports, which undoubtedly increases the power consumption of the UE. At present, there is no relevant technical solution for this scenario for reference.

FIG. 2 is a flowchart of a method for information indication according to some embodiments. As illustrated in FIG. 2, the method for information indication according to some embodiments of the disclosure may be applied to a network device side. The network device may include a core network, a base station, a relay station, a remote radio unit, and the like. The method for information indication according to some embodiments of the disclosure may include the following step.

Step 201, an indication is sent to a UE.

In embodiments of the disclosure, the indication is used for indicating the UE not to perform a cell search under a given time condition.

The indication for indicating the UE not to perform the cell search under the given time condition includes at least one of:

indicating the UE not to monitor a paging message under the given time condition;

indicating the UE not to perform a tracking area update (TAU) under the given time condition, in which not to perform the TAU under the given time condition may be not to perform the TAU after a TAU timer expires; or indicating the UE not to perform the cell search and to be in a dormant state, under the given time condition.

In embodiments of the disclosure, the given time condition includes within a set time duration or before a set timing: in which the set time duration or the set timing is determined by a core network device and/or an access network device. The access network device may include a device such as a base station, a relay station, a remote radio unit, and the like.

In embodiments of the disclosure, not to monitor the paging message under the given time condition includes at least one of:

in response to a discontinuous reception (DRX) being configured for the UE, indicating the UE not to monitor the paging message at one or more paging occasions (POs) within a DRX cycle;

in response to an extended DRX (eDRX) being configured for the UE, indicating the UE not to monitor the paging message within one or more paging time windows (PTWs) or indicating the UE not to monitor the paging message at one or more POs within at least one eDRX cycle within at least one PTW: or in response to a power saving mode (PSM) being configured for the UE, indicating the UE not to monitor the paging message during an operation duration of an activation timer or indicating the UE not to monitor the paging message at one or more POs within at least one eDRX cycle during the operation duration of the activation timer.

In embodiments of the disclosure, sending the indication to the UE includes: sending the indication through a radio resource control (RRC) message during a process of the UE entering an RRC non-connected state from an RRC connected state. For example, the base station may send the indication through an RRC release-NB message or send the indication through an RRCEarlyDataComplete-NB message during the process of the UE entering the RRC non-connected state from the RRC connected state.

Sending the indication to the UE may further include: sending the indication while configuring an eDRX parameter and/or a PSM parameter for the UE. For example, the core network device may also send the indication to the UE. The core network device may send the indication to the UE while configuring the eDRX parameter and/or the PSM parameter for the UE. For example, the core network device may send the indication to the UE during the process of the UE performing a TAU and/or attaching.

In embodiments of the disclosure, when the set time duration or the set timing is determined by the access network device, the UE is indicated by the access network device not to perform the cell search in the set time duration or before the set timing. For example, the access network device predicts that a timing when a current network is unable to provide network coverage for the UE is T1 and a next timing when the current network is able to provide network coverage for the UE is T2 and indicates the UE not to perform the cell search during a time duration of T2–T1.

In embodiments of the disclosure, when the set time duration or the set timing is determined by the core network device, the UE is indicated by the core network device not to perform the cell search when the UE enters an RRC non-connected state within the set time duration or before the set timing. For example, a timing when the core network device sends the indication is T3, a stop timing for providing network coverage for the UE is T4, and a next timing for network coverage is T5, and when the core network device indicates the UE to enter the RRC non-connected state before T4, the core network device indicates the UE not to perform the cell search in a time duration of T5–T4.

FIG. 3 is a flowchart of a method for information indication according to some embodiments. As illustrated in FIG. 3, the method for information indication according to some embodiments of the disclosure may be applied to a UE side. The method for information indication according to some embodiments of the disclosure may include the following steps.

Step 301, an indication sent by a network device is received.

In embodiments of the disclosure, not to perform the cell search under the given time condition includes at least one of:

not to monitor a paging message under the given time condition;

not to perform a TAU under the given time condition, in which not to perform the TAU under the given time condition may be that the UE does not perform the TAU after a TAU timer expires: or not to perform the cell search and to be in a dormant state, under the given time condition.

The given time condition includes within a set time duration or before a set timing: in which the set time duration or the set timing is determined by a core network device and/or an access network device.

Step, 302, it is determined not to perform a cell search under a given time condition.

In embodiments of the disclosure, not to monitor the paging message under the given time condition includes at least one of:

when it is determined that the UE is configured with a DRX, not to monitor the paging message at one or more POs within a DRX cycle;

when it is determined that the UE is configured with an eDRX, not to monitor the paging message within one or more PTWs or not to monitor the paging message at one or more POs within at least one eDRX cycle within at least one PTW: or when it is determined that the UE is configured with a PSM, not to monitor the paging message during an operation duration of an activation timer or indicating the UE not to monitor the paging message at one or more POs within at least one eDRX cycle during the operation duration of the activation timer.

In embodiments of the disclosure, receiving the indication sent by the network device includes: receiving the indication sent by an access network device through an RRC message during a process of the UE entering an RRC non-connected state from an RRC connected state.

Alternatively, the indication sent by the core network device is received during the process of the UE performing a TAU and/or attaching.

On the basis of the processing flow of the foregoing embodiments, the method for information indication of the embodiments of the disclosure further includes:

determining to enter an RRC non-connected state and not to perform the cell search under the given time condition, according to the indication.

For example, according to the received indication sent by the network, the UE does not monitor the paging message: or the UE does not perform the TAU; or the UE does not perform the cell search, and is in a dormant state.

In embodiments of the disclosure, the UE may include an NB-IOT terminal, an extended MTC terminal, etc. In order to save the power for this type of terminal, the network device may configure the parameter such as DRX, eDRX, or PSM for the UE, so as to achieve the purpose of power saving for the UE.

FIG. 4 is a schematic diagram of a DRX according to some embodiments. As illustrated in FIG. 4, a gNB configures a UE for a DRX-related parameter. The DRX-related parameter may include a parameter such as a DRX period. The UE may monitor a paging message of a network according to the DRX-related parameter.

In embodiments of the disclosure, in order to make the UE more power-saving, the base station further sends the indication to the UE through the RRC message, the indication for indicating the UE not to monitor the paging message at one or more POs of the DRX cycle. For example, when the base station predicts that the timing when the current network is unable to provide network coverage for the UE is T1, and the next timing when the network is able to provide network coverage for the UE is T2, the base station indicates the UE not to monitor the paging message and/or not to perform the cell search in the time duration of T2–T1. The indication includes information about the time duration of T2–T1 of not performing the cell search, to indicate the UE not to monitor the paging message and/or not to perform the cell search starting from T1. The base station may send the indication through the RRC release-NB message or send the indication through the RRCEarlyDataComplete-NB message during the process of the UE entering the non-connected state from the connected state. After the UE receives the indication, it no longer monitors the paging message in the DRX mode.

Figure 5:
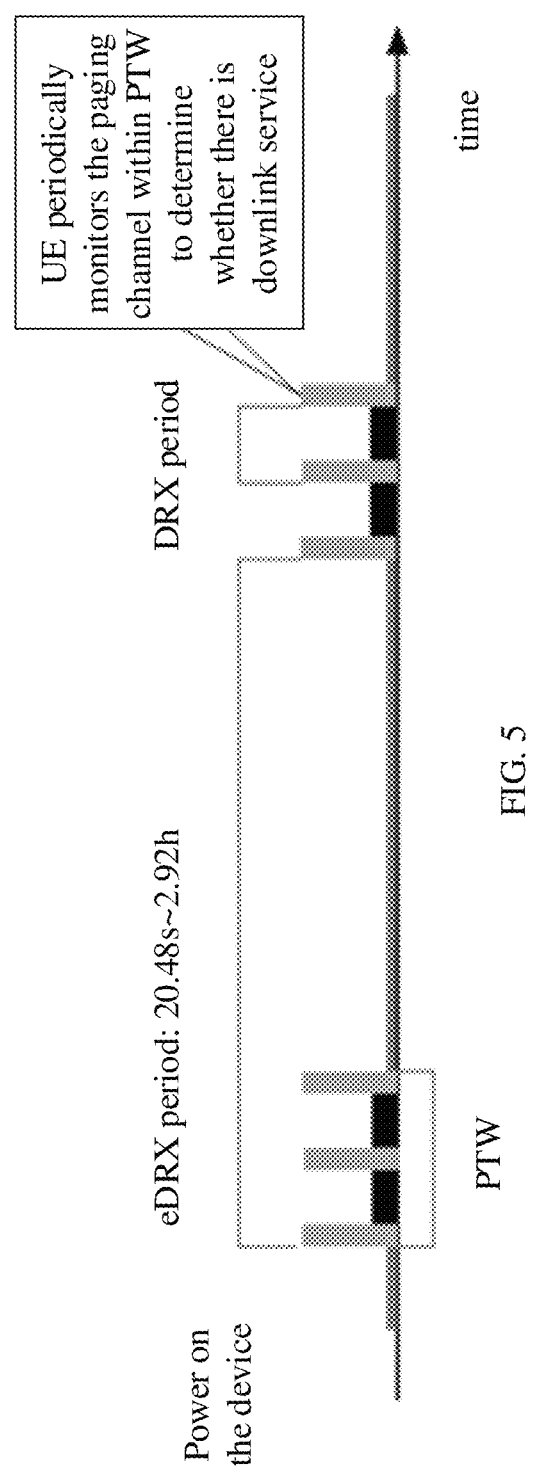
FIG. 5 is a schematic diagram of an eDRX according to some embodiments.

FIG. 5 is a schematic diagram of an eDRX according to some embodiments. As illustrated in FIG. 5, in each eDRX cycle, the UE may receive downlink data only within the set PTW, and the UE may be in a dormant state and not receive downlink data within a remaining time duration. The eDRX cycle ranges from 20.48 s to 2.92 h. In each eDRX cycle, one PTW is included. Within the PTW, the UE monitors the paging channel according to the DRX cycle (the DRX cycle is short, and it may be considered that the UE does not sleep and is always reachable) in order to receive downlink data, and the UE is in a dormant state within a remaining time duration.

In the eDRX parameter, the core network device and the UE negotiate the following parameter: an eDRX cycle ($T_{eDRX, H}$) and a PTW window length.

The core network device configures the eDRX parameter to the UE during the process of the UE attaching to the network or the process of the TAU. In addition, the core network device may also send the eDRX parameter to the gNB through the paging message of the S1 interface, that is, when the core network device initiates the paging to the UE, the eDRX parameter may also be sent to the gNB. In embodiments of the disclosure, when the core network device needs to send the indication to the UE, it is determined that a timing when the core network device sends the indication is T3, a stop timing for providing network coverage for the UE is T4, and a next timing for network coverage is T5, and when the core network device indicates the UE to enter the RRC non-connected state before T4, the core network device indicates the UE not to perform the cell search in a time duration of T5–T4. Then the indication may include an indication of not performing the cell search, and when the eDRX parameter is configured to the UE, the indication is sent to the UE. After the UE receives the eDRX parameter and the indication, it parses the time duration information T5–T4 from the indication. Under the eDRX, when the UE enters the RRC non-connected state before T4, it does not perform the cell search starting from T4 and it enters a dormant state without monitoring the paging message, that is, the UE does not monitor the paging message within one or more PTWs.

Figure 6:
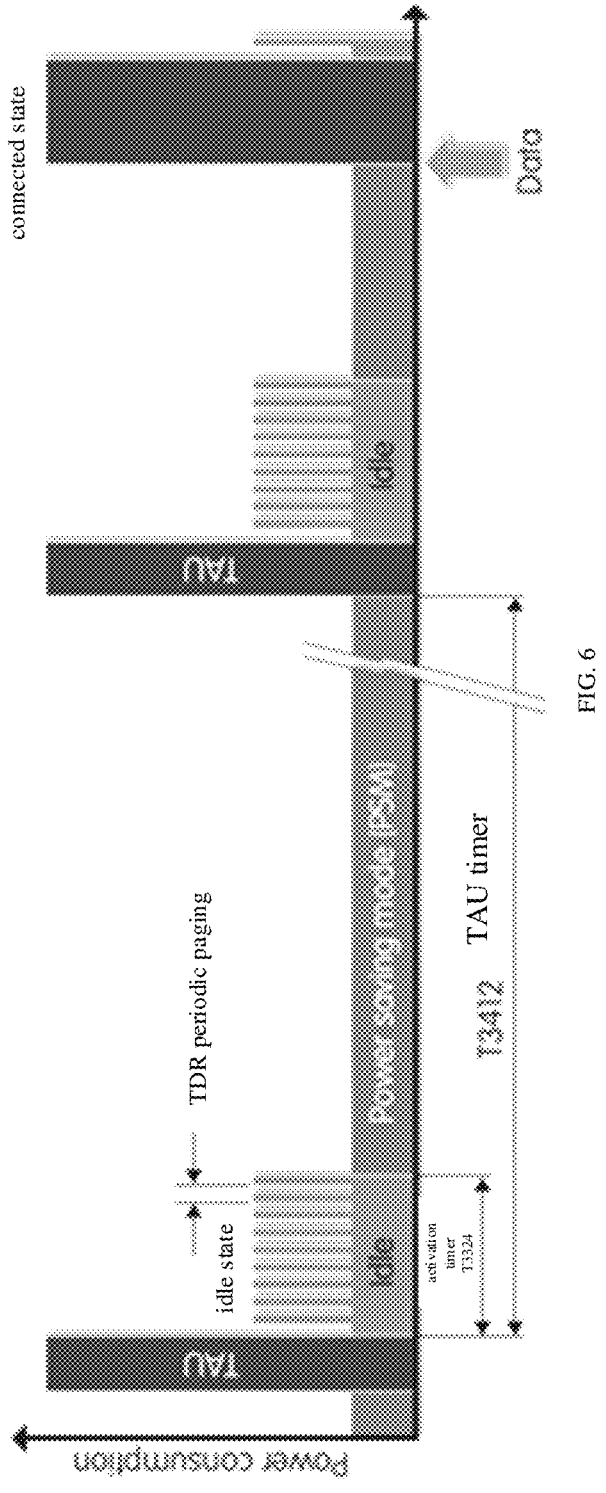
FIG. 6 is a schematic diagram of a PSM according to some embodiments.
Figure 7:
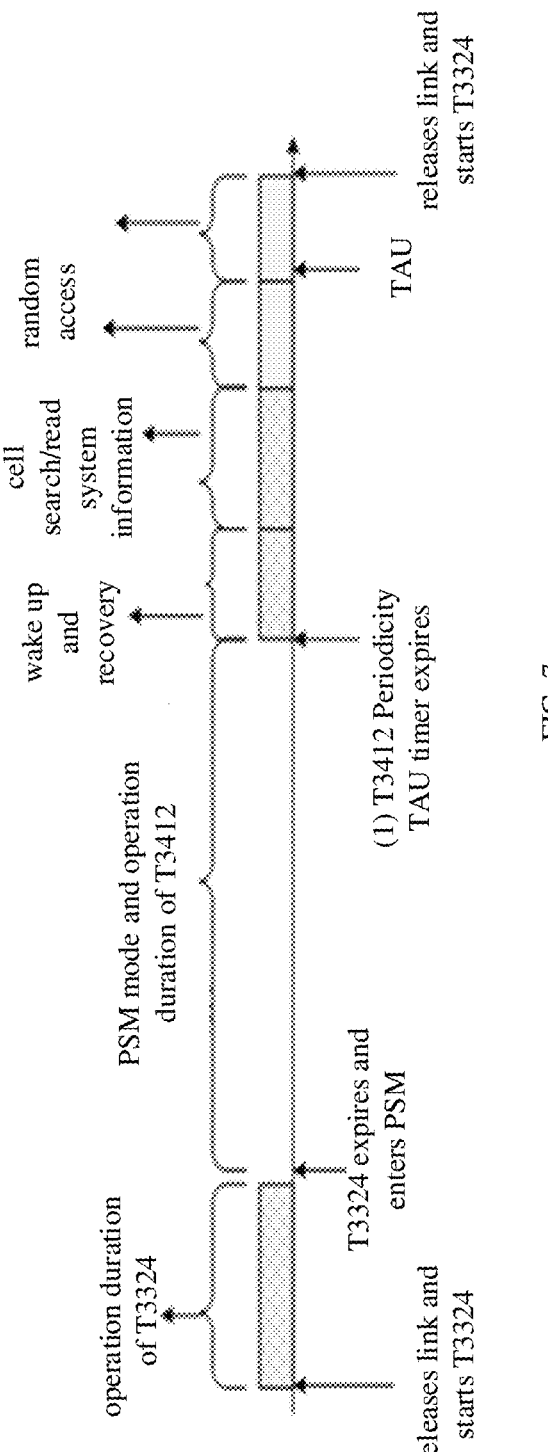
FIG. 7 is a schematic diagram of a PSM according to some embodiments.

FIG. 6 is a schematic diagram of a PSM according to some embodiments and FIG. 7 is a schematic diagram of a PSM according to some embodiments. As illustrated in FIG. 6 and FIG. 7, in order to further save the power, the PSM is introduced. In the PSM state, downlink data are unreachable and the UE is in a dormant state. At this time, there are two ways for waking up the UE. The first is when the UE needs to send uplink data and the second is when a TAU timer expires. When entering the PSM, the UE no longer receives the paging message and the downlink data. T3321 and T3412 are two timers. T3321 and T3412 are configured by the core network device for the UE. Usually, when the UE attaches to the network and performs the TAU, the core network device configures the PSM parameter and/or the eDRX parameter, as well as time duration parameters of T3321 and T3412 to the UE.

For the eDRX, the UE may be in a dormant state without the PTW. At this time, the UE may not receive downlink data and may not perform any measurements on the serving cell and neighboring cell(s): when the UE enters the PSM state, the UE may not receive downlink data and may not perform any measurement on the serving cell and neighbor cell(s).

In embodiments of the disclosure, the core network device configures the PSM parameter and the indication to the UE in the process of the UE attaching to the network or the process of the TAU. When the core network device needs to send the indication to the UE, it is determined that a timing when the core network device sends the indication is T3, a stop timing for providing network coverage for the UE is T4, and a next timing for network coverage is T5, and when the core network device indicates the UE to enter the RRC non-connected state before T4, the core network device indicates the UE not to perform the cell search in a time duration of T5–T4, and the indication may include an indication that the cell search may not be performed. While configuring the PSM parameter to the UE, the indication is sent to the UE. After the UE receives the eDRX parameter and the indication, it parses the time duration information T5–T4 from the indication. Under the PSM, when the UE enters the RRC non-connected state before T4, it may not perform the cell search starting from T4, and enter the dormant state without monitoring the paging message. In the eDRX mode, it indicates the UE not to monitor the paging message at one or more POs within at least one eDRX cycle during the operation duration of the activation timer.

Figure 8:
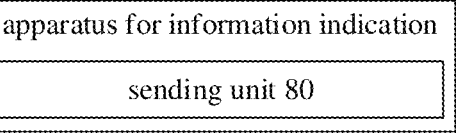
FIG. 8 is a block diagram of an apparatus for information indication according to some embodiments.

FIG. 8 is a block diagram of an apparatus for information indication according to some embodiments. As illustrated in FIG. 8, the apparatus for information indication according to some embodiments may be applied to a network side device. The apparatus for information indication according to some embodiments may include a sending unit 80.

The sending unit 80 is configured to send an indication to a UE; the indication for indicating the UE not to perform a cell search under a given time condition.

It indicates the UE not to monitor a paging message under the given time condition:

it indicates the UE not to perform a TAU under the given time condition, in which not to perform the TAU under the given time condition may be that not to perform the TAU after a TAU timer expires; or it indicates the UE not to perform the cell search and to be in a dormant state, under the given time condition.

In some embodiments of the disclosure, the given time condition includes within a set time duration or before a set timing: in which the set time duration or the set timing is determined by a core network device and/or an access network device. The access network device may include a device such as a base station, a relay station, and a remote radio unit.

In some embodiments of the disclosure, in response to a DRX being configured for the UE, it indicates the UE not to monitor the paging message at one or more POs within a DRX cycle.

In response to an eDRX being configured for the UE, it indicates the UE not to monitor the paging message within one or more PTWs or it indicates the UE not to monitor the paging message at one or more POs within at least one eDRX cycle within at least one PTW.

In response to a PSM being configured for the UE, it indicates the UE not to monitor the paging message during an operation duration of an activation timer or it indicates the UE not to monitor the paging message at one or more POs within at least one eDRX cycle during the operation duration of the activation timer.

In embodiments of the disclosure, the sending unit 80 is further configured to send the indication through an RRC message during a process of the UE entering an RRC non-connected state from an RRC connected state. For example, the base station may send the indication through the RRC release-NB message or send the indication through the RRCEarlyDataComplete-NB message during the process of the UE entering the RRC non-connected state from the RRC connected state.

The sending unit 80 is further configured to send the indication while configuring an eDRX parameter and/or a PSM parameter for the UE. For example, the core network device may also send the indication to the UE. The core network device may send the indication to the UE while configuring the eDRX parameter and/or the PSM parameter for the UE. For example, the core network device may send the indication to the UE during the process of the UE performing the TAU and/or attaching.

In embodiments of the disclosure, when the set time duration or the set timing is determined by the access network device, the UE is indicated by the access network device not to perform the cell search in the set time duration or before the set timing. For example, the access network device predicts that a timing when a current network is unable to provide network coverage for the UE is T1 and a next timing when the current network is able to provide network coverage for the UE is T2 and indicates the UE not to perform the cell search in a time duration of T2–T1.

In embodiments of the disclosure, when the set time duration or the set timing is determined by the core network device, the UE is indicated by the core network device not to perform the cell search when the UE enters an RRC non-connected state within the set time duration or before the set timing. For example, a timing when the core network device sends the indication is T3, a stop timing for providing network coverage for the UE is T4, and a next timing for network coverage is T5, and when the core network device indicates the UE to enter the RRC non-connected state before T4, the core network device indicates the UE not to perform the cell search in a time duration of T5–T4.

In some embodiments, the sending unit 80 and the like may be implemented by one or more of: a central processing unit (CPU), a graphics processing unit (GPU), a base processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a microcontroller unit (MCU), a microprocessor, or other electronic components, or by combining multiple radio frequency (RF) antennas, to execute steps of the method for information indication of the foregoing embodiments.

In embodiments of the disclosure, the specific manner in which each unit in the apparatus for information indication in FIG. 8 performs operations has been described in detail in the embodiments of the methods and will not be described in detail herein.

Figure 9:
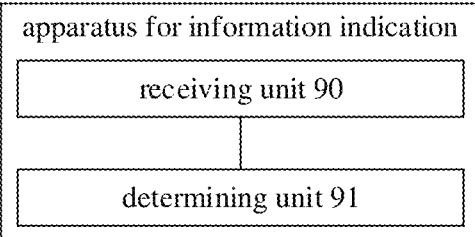
FIG. 9 is a block diagram of an apparatus for information indication according to some embodiments.

FIG. 9 is a block diagram of an apparatus for information indication according to some embodiments. As illustrated in FIG. 9, the apparatus for information indication according to some embodiments of the disclosure may be applied to a UE. The apparatus for information indication includes a receiving unit 90 and a determining unit 91.

The receiving unit 90 is configured to receive an indication sent by a network device.

The determining unit 91 is configured to determine not to perform a cell search under a given time condition.

In some embodiments, not to perform the cell search under the given time condition includes at least one of:

not to monitor a paging message under the given time condition;

not to perform a TAU under the given time condition, in which not to perform the TAU under the given time condition may be that the UE does not perform the TAU after a TAU timer expires: or not to perform the cell search and to be in a dormant state, under the given time condition.

In some embodiments, the determined unit 91 is further configured to:

determine to enter an RRC non-connected state and not to perform the cell search under the given time condition, according to the indication.

The given time condition includes within a set time duration or before a set timing, in which the set time duration or the set timing is determined by a core network device and/or an access network device.

In embodiments of the disclosure, the determined unit 91 is further configured to at least one of:

when it is determined that the UE is configured with a DRX, not to monitor the paging message at one or more POs within a DRX cycle;

when it is determined that the UE is configured with an extended DRX (eDRX), not to monitor the paging message within one or more PTWs or not to monitor the paging message at one or more POs within at least one eDRX cycle within at least one PTW: or when it is determined that the UE is configured with a PSM, not to monitor the paging message during an operation duration of an activation timer or not to monitor the paging message at one or more POs within at least one eDRX cycle during the operation duration of the activation timer.

In embodiments of the disclosure, the receiving unit 90 is further configured to: receive the indication sent by an access network device through an RRC message during a process of the UE entering an RRC non-connected state from an RRC connected state.

Alternatively, the indication sent by the core network device is received during a process of the UE performing a TAU and/or attaching.

In embodiments of the disclosure, the UE determines to enter an RRC non-connected state and not to perform the cell search under the given time condition, according to the indication.

For example, according to the received indication sent by the network, the UE is indicated not to monitor the paging message, or the UE does not perform the TAU, or the UE does not perform the cell search and is in a dormant state.

In some embodiments, the receiving unit 90, the determining unit 91, and the like may be implemented by one or more of: a central processing unit (CPU), a graphics processing unit (GPU), a base processor (BP), an application specific integrated circuit (ASIC), a digital signal processor (DSP), a programmable logic device (PLD), a complex programmable logic device (CPLD), a field-programmable gate array (FPGA), a general-purpose processor, a controller, a microcontroller unit (MCU), a microprocessor, or other electronic components, or by combining multiple radio frequency (RF) antennas, to execute steps of the method for information indication of the foregoing embodiments.

In embodiments of the disclosure, the specific manner in which each unit in the apparatus for information indication in FIG. 9 performs operations has been described in detail in the embodiments of the methods and will not be described in detail herein.

Figure 10:
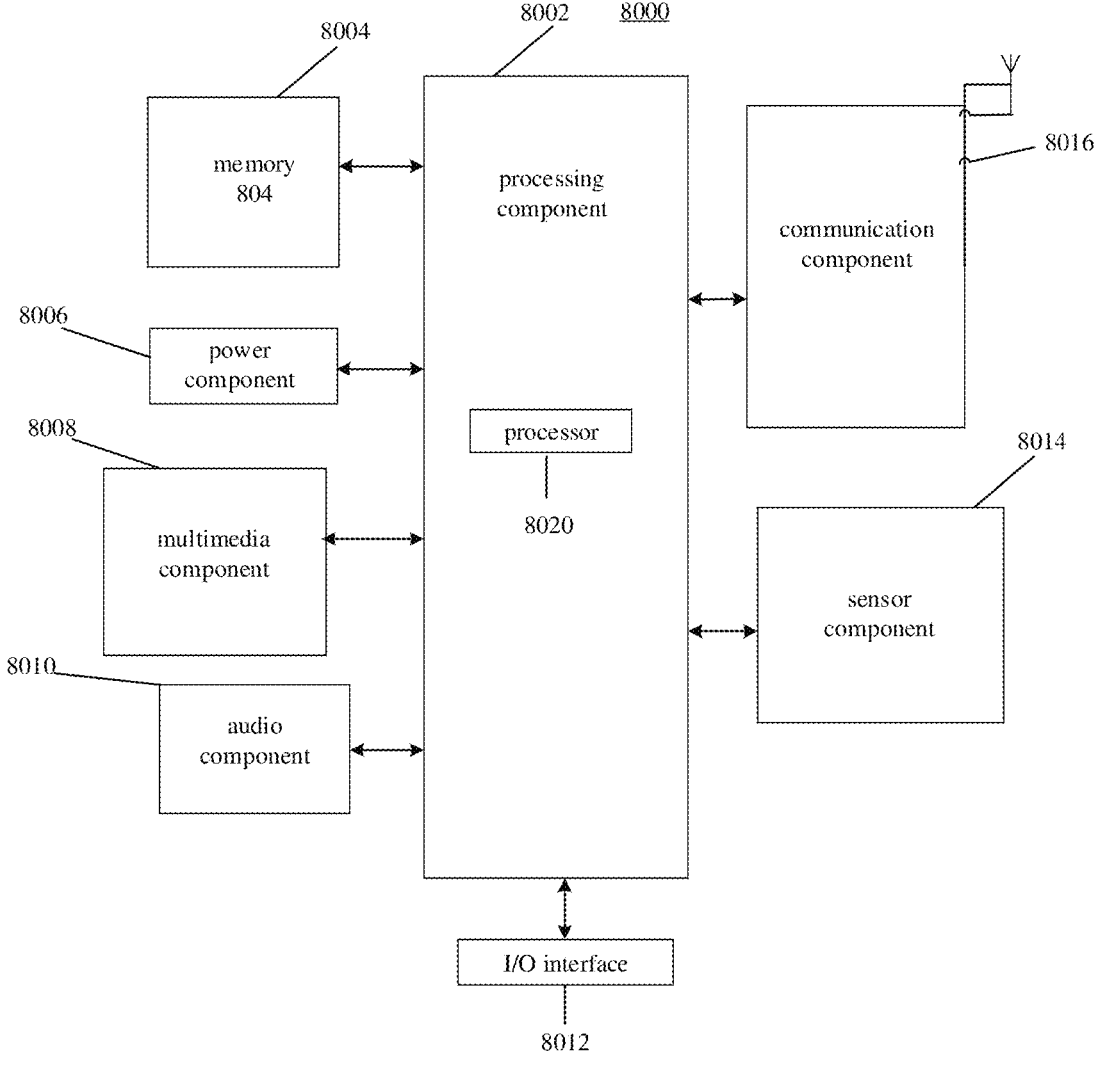
FIG. 10 is a block diagram of a user equipment according to some embodiments.

FIG. 10 is a block diagram of a UE 8000 according to some embodiments. For example, the UE 800 may be a mobile phone, a computer, a digital broadcast terminal, a messaging device, a gaming console, a tablet, a medical device, exercise equipment, a personal digital assistant, and the like.

Referring to FIG. 10, the UE 800 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the UE 800, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the UE 800. Examples of such data include instructions for any applications or methods operated on the UE 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the UE 800. The power component 806 may include a power management system, one or more power sources, and any other components associated with the generation, management, and distribution of power in the UE 800.

The multimedia component 808 includes a screen providing an output interface between the UE 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a time duration and a pressure associated with the touch or swipe action. In some embodiments, the multimedia component 808 includes a front camera and/or a rear camera. The front camera and the rear camera may receive an external multimedia datum while the UE 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the UE 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the UE 800. For instance, the sensor component 814 may detect an open/closed status of the UE 800, relative positioning of components, e.g., the display and the keypad, of the UE 800, a change in position of the UE 800 or a component of the UE 800, a presence or absence of user contact with the UE 800, an orientation or an acceleration/deceleration of the UE 800, and a change in temperature of the UE 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the UE 800 and other devices. The UE 800 can access a wireless network based on any communication standard, such as WiFi, 2G, or 3G, or a combination thereof. In one exemplary embodiment, the communication component 816 receives a broadcast signal or broadcast associated information from an external broadcast management system via a broadcast channel. In one exemplary embodiment, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the UE 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 804, executable by the processor 820 in the UE 800, for performing the above-described methods. For example, the non-transitory computer-readable storage medium may be a ROM, a RAM, a CD-ROM, a magnetic tape, a floppy disc, an optical data storage device, and the like.

The embodiments of the disclosure further describe a network device, including a processor, a transceiver, a memory, and an executable program stored on the memory and executable by the processor, in which when the processor executes the executable program, the processor performs steps of the method for information indication as described in the foregoing embodiments.

The embodiments of the disclosure further describe a UE, including a processor, a transceiver, a memory, and an executable program stored on the memory and executable by the processor, in which when the processor executes the executable program, the processor performs steps of the method for information indication as described in the foregoing embodiments.

The embodiments of the disclosure further describe a storage medium, which stores an executable program, and the executable program is executed by a processor to execute steps of the method for information indication as described in the foregoing embodiments.

In the method and the apparatus for information indication, the network device, the UE, and the storage medium, provided in the embodiments of the disclosure, the network device sets the indication information for the UE to indicate the UE not to perform the cell search under the prescribed time condition, so as to achieve a purpose of power saving. The network device in the embodiments of the disclosure, based on a cell coverage rule, indicates the UE not to search for a cell and not to monitor a corresponding paging message according to a power saving mode configured for the UE when it is determined that the cell is unable to provide services for the UE. According to current network coverage characteristics and based on a power saving mode supported by the UE, the embodiments of the disclosure may determine a more accurate power saving mode for the UE to indicate the UE to monitor the paging message based on the determined mode. According to the paging message monitor mode determined by the network device, the UE in the embodiments of the disclosure may not monitor the paging message within the indicated time duration, thereby achieving a better power saving effect.

Other embodiments of the disclosure will be apparent to those skilled in the art from consideration of the specification and practice of the disclosure provided herein. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

The invention claimed is:

1. A method for information indication, performed by a user equipment (UE), the method comprising:
   determining that the UE does not perform a cell search during a set time duration,
   wherein the set time duration corresponds to a time duration of T2–T1, T1 is a timing when a current network stops providing network coverage for the UE, T2 is a next timing when the network starts to provide coverage for the UE, and both T1 and T2 are indicated by an access network device;
   wherein not performing the cell search during the set time duration comprises: not performing a tracking area update (TAU).

2. The method of claim 1, wherein not performing the cell search during the set time duration further comprises at least one of:
   not monitoring a paging message;

or
   not performing the cell search and being in a dormant state.

3. The method of claim 2, wherein the set time duration is determined by at least one of the access network device.

4. The method of claim 3, wherein not monitoring the paging message comprises:
   in response to a discontinuous reception (DRX) being configured for the UE, not monitoring the paging message at one or more paging occasions (POs) within a DRX cycle; or
   in response to an extended DRX (eDRX) being configured for the UE, not monitoring the paging message within one or more paging time windows (PTWs) or indicating the UE not to monitor the paging message at one or more POs within at least one eDRX cycle within at least one PTW.

5. The method of claim 3, wherein not monitoring the paging message comprises:
   in response to a power saving mode (PSM) being configured for the UE, not monitoring the paging message during an operation duration of an activation timer or not monitoring the paging message at one or more paging occasions (POs) within at least one extended discontinuous reception (eDRX) cycle during the operation duration of the activation timer.

6. The method of claim 2, wherein not performing the TAU comprises:
   not to perform the TAU after a TAU timer expires.

7. A non-transitory computer-readable storage medium having stored thereon an executable program that, when executed by a processor of a user equipment (UE), causes the UE to perform the method of claim 1.

8. The method of claim 1, further comprising:
   receiving an indication sent by the access network device, wherein the indication indicating the UE does not perform the cell search, and the indication comprises T1 and T2.

9. The method of claim 8, wherein receiving the indication sent by the access network device comprises:
   receiving the indication sent by the access network device through a radio resource control (RRC) message when the UE enters an RRC non-connected state from an RRC connected state.

10. The method of claim 1, wherein determining that the UE does not perform the cell search during the set time duration comprises:
   determining to enter a radio resource control (RRC) non-connected state and not to perform the cell search, according to the indication.

11. A method for information indication, performed by an access network device, the method comprising:
   sending T1 and T2 to a user equipment (UE), wherein T1 is a timing when a current network stops providing network coverage for the UE, T2 is a next timing when the network starts to provide coverage for the UE, T1 and T2 are used by the UE to determine that the UE does not perform a cell search during a set time duration, and the set time duration corresponds to a time duration of T2–T1;
   wherein not performing the cell search during the set time duration comprises: not performing a tracking area update (TAU).

12. The method of claim 11, wherein not performing the cell search during the set time duration further comprises at least one of:

not monitoring a paging message;
or
not performing the cell search and being in a dormant state.

13. The method of claim 12, wherein the set time duration is determined by the access network device.

14. The method of claim 13, wherein not monitoring the paging message comprises:

when the UE is configured with a discontinuous reception (DRX), the UE does not monitor the paging message at one or more paging occasions (POs) within a DRX cycle;

when the UE is configured with an extended DRX (eDRX), the UE does not monitor the paging message within one or more paging time windows (PTWs), or not monitor the paging message at one or more POs within at least one eDRX cycle within at least one PTW; or when the UE is configured with a power saving mode (PSM), the UE does not monitor the paging message during an operation duration of an activation timer, or at one or more paging occasions (POs) within at least one eDRX cycle during the operation duration of the activation timer.

15. A non-transitory computer-readable storage medium having stored thereon an executable program that, when executed by a processor of an access network device, causes the access network device to perform the method of claim 11.

16. The method of claim 11, wherein sending T1 and T2 to the UE comprises:

sending an indication to the UE, wherein the indication indicating the UE does not perform the cell search, and the indication comprises T1 and T2.

17. The method of claim 16, wherein sending the indication to the UE comprises:

sending the indication while configuring at least one of an extended discontinuous reception (eDRX) parameter or a power saving mode (PSM) parameter for the UE.

18. The method of claim 17, wherein sending the indication while configuring the eDRX parameter or the PSM parameter for the UE comprises:

sending the indication when the UE performs a tracking area update (TAU) and/or attaching.

19. A user equipment, comprising:
a processor;
a transceiver; and
a memory storing an executable program,
wherein the processor is configured determine that the UE does not perform a cell search during a set time duration,
wherein the set time duration corresponds to a time duration of T2−T1, T1 is a timing when a current network stops providing network coverage for the UE, T2 is a next timing when the network starts to provide coverage for the UE, and both T1 and T2 are indicated by an access network device;
wherein not performing the cell search during the set time duration comprises: not performing a tracking area update (TAU).

20. A network device, comprising:
a processor;
a transceiver; and
a memory storing an executable program,
wherein the processor is configured to perform the method of claim 11.

\* \* \* \* \*